United States Patent
Ratowsky

[15] 3,682,547
[45] Aug. 8, 1972

[54] PHOTOGRAPHIC EASEL
[72] Inventor: Simon Ratowsky, Willowdale, Ontario, Canada
[73] Assignee: Monrick Holdings Limited, Ontario, Canada
[22] Filed: July 6, 1970
[21] Appl. No.: 52,435

[52] U.S. Cl. ..................355/74, 95/37, 355/54
[51] Int. Cl. ..................................G03b 27/58
[58] Field of Search ................355/54, 74; 95/37

[56] References Cited

UNITED STATES PATENTS 2,004,232   6/1935   Weed..................95/37 X
2,823,581   2/1958   Greenspan............355/54
766,967    8/1904   Newman................95/37

FOREIGN PATENTS OR APPLICATIONS 551,355   11/1956   Italy..................95/37

Primary Examiner—Samuel S. Matthews
Assistant Examiner—Russell E. Adams, Jr.
Attorney—Westell & Hanley

[57] ABSTRACT

A photographic easel for printing a number of pictures on a single sheet of photographic paper, in which the paper is mounted on a carrier which slides in two mutually perpendicular directions on a platform and beneath a cover which carries a mask having a centrally located aperture. The carrier is manually operable and movable between end limits in guide means on the platform to register different portions of the paper beneath the aperture in the mask.

8 Claims, 7 Drawing Figures

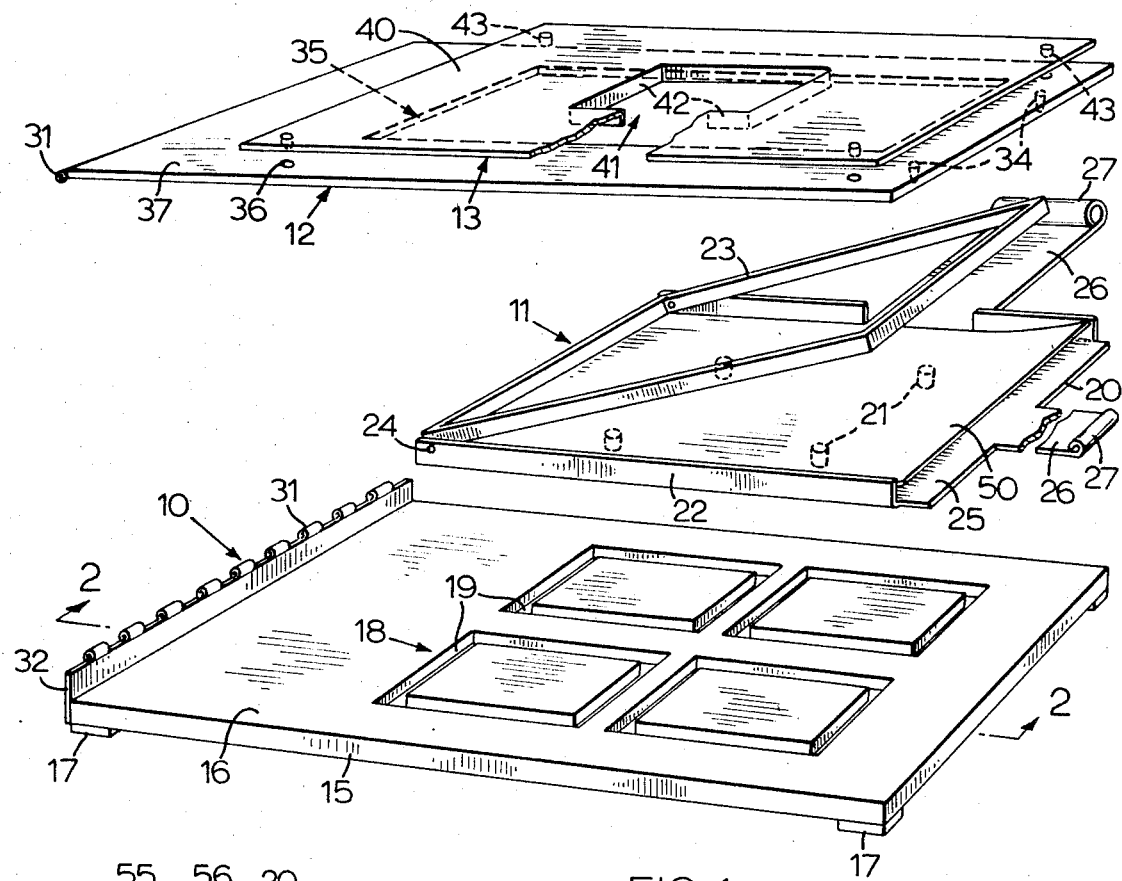
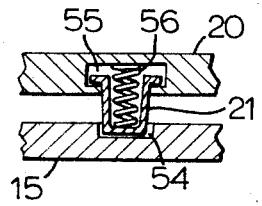
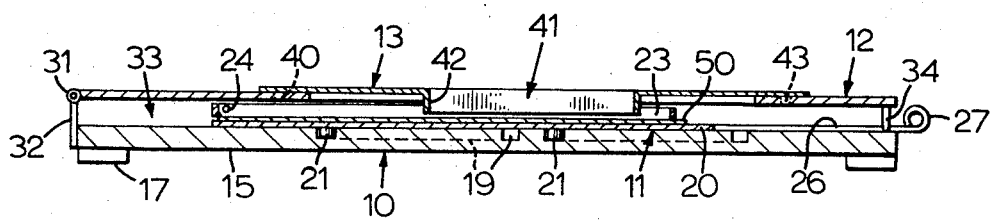

PATENTED AUG 8 1972

INVENTOR.
SIMON RATOWSKY
BY Westell & Hanley

PHOTOGRAPHIC EASEL

The present invention relates to a photographic easel for printing pictures.

In darkroom work, using an enlarger, it is advantageous to print a number of pictures on a single sheet of photographic paper and divide the paper later into single pictures. For proper alignment of the prints on the sheet of paper, sequential automatic positioning of the sheet is desirable. A number of types of easels are presently known which accomplish this purpose either by using masks having different apertures or by mounting the paper on a frame and moving the frame about beneath the mask. All these types of easels are relatively difficult to operate, achieve unsatisfactory results, or are expensive to produce.

It is an object of the present invention to provide a photographic easel which is inexpensive to produce, simple to operate, and provides accurately positioned prints on a photographic sheet.

An example embodiment of the invention is shown in the accompanying drawings in which:

FIG. 1 is an exploded perspective view of an easel;

FIG. 2 is a view in cross-section taken along the line 2—2 of FIG. 1;

FIG. 6a is a fragmentary cross-sectional view showing a modified carrier pin.

Figure 3:
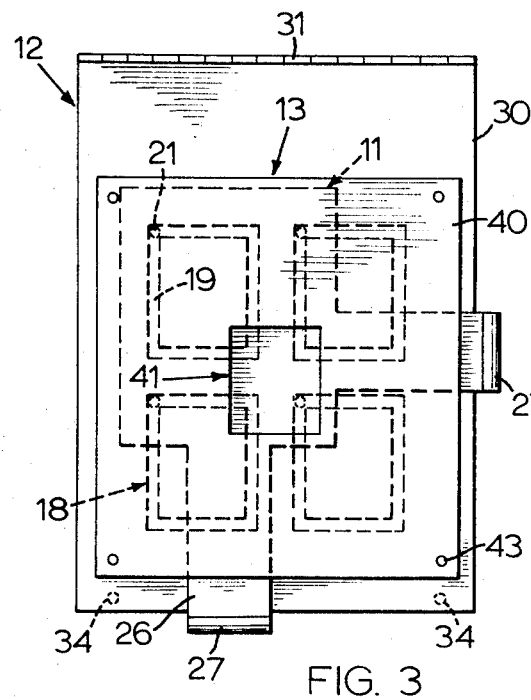
FIGS. 3, 4 and 5 are plan views of the easel of FIG. 1, showing the carrier in three of four different positions.

The embodiment shown in the drawings comprises a platform 10 having a carrier 11 slidable on the platform, a cover 12 hinged on the platform, and a mask 13 carried by the cover.

Platform 10 comprises a rectangular member 15 having an upwardly facing planar surface 16 and feet 17 depending from each corner of the lower or underside surface of the member. Upper surface 16 of member 15 carries a guideway 18 in the form of a plurality of grooves 19 each forming a closed rectangular path. The paths of grooves 19 are isolated one from another and are arranged on upper surface 16 of platform 10 in grid formation, i.e. forming four quadrants of a larger rectangle.

Carrier 11 comprises a rectangular member 20 having four pins 21 depending from its lower or underside surface. Pins 21 are shaped to register one with each groove 19 and in a corresponding location in each groove; for example when one pin is located in a corner of one groove path, the other pins of the carrier are located in the same relative position in the other grooved paths, as seen in FIGS. 3 to 6 of the drawings. Pins 21 are movable along grooves 19 when carrier 20 is slid over upper surface 16 of platform 10. Member 20 of carrier 11 is upturned along opposing side edges to form a pair of flanges 22 and a rectangular locking frame 23 is hinged along one edge to a corresponding edge of member 20 by means of a pair of pins 24 pivotally interconnecting the frame with the flanges, whereby when frame 23 is pivoted downwardly onto upper, planar surface 25 of member 20 the frame circumscribes the edge of that surface and lies adjacent flanges 22. Two handles 26 extend laterally, and at right angles one to the other, from two intersecting edges of member 20 and in the plane of that member. Handles 26 carry grips 27 at their free ends.

Cover 12 of the easel comprises a flat, rectangular member 30 which is pivotally mounted along one edge to platform 10 by a hinge 31 which has a flange 32 upstanding from the edge of member 15. Flange 32 spaces cover 12, when closed over platform 10, from upper surface 16 of the platform to provide a space 33 between the cover and the platform in which carrier 11 is free to move. Bosses 34 (see FIG. 2), extending downwardly from the undersurface of cover 12 adjacent that edge of the cover opposite hinge 31, bear against platform 10 and maintain the cover in parallel, spaced relationship with the platform. Cover 12 has a large central aperture 35 and a plurality of holes 36 in upper surface 37 of the cover about the periphery of aperture 35.

Mask 13 of the easel comprises a rectangular sheet member 40 of a size larger than that of central aperture 35 in cover 12. Member 40 carries a rectangular aperture 41 having a peripheral flange 42 depending from the underside of the sheet member which also carries a plurality of pins 43 adapted to snap fit into holes 36 in cover 12. The width of flange 42 is such that, when cover 12 is closed over platform 10, the flange will inhibit light from entering under the cover through aperture 41 and yet will leave carrier 11 free to slide in space 33.

In the use of the described embodiment, cover 12 is opened by pivoting it about hinge 31, frame 23 of carrier 11 is opened by pivoting it about pins 24, and a sheet 50 of photographic paper is laid on upper surface 25 of member 20 of the carrier. Frame 23 is then lowered to rest on sheet 50, thereby anchoring the paper on the carrier which is positioned on platform 10 with pins 21 each registering in one of grooves 19 of guideway 18. Cover 12 is next closed over carrier 11 and a mask 13 is snap-fitted onto the cover by engaging pins 43 of the mask in holes 36 on the cover. In this position, with cover 12 closed over carrier 11, flange 42 circumscribing aperture 41 of mask 13 inhibits light from entering the space 33 between the cover and the platform in which the carrier is slidable.

Figure 4:
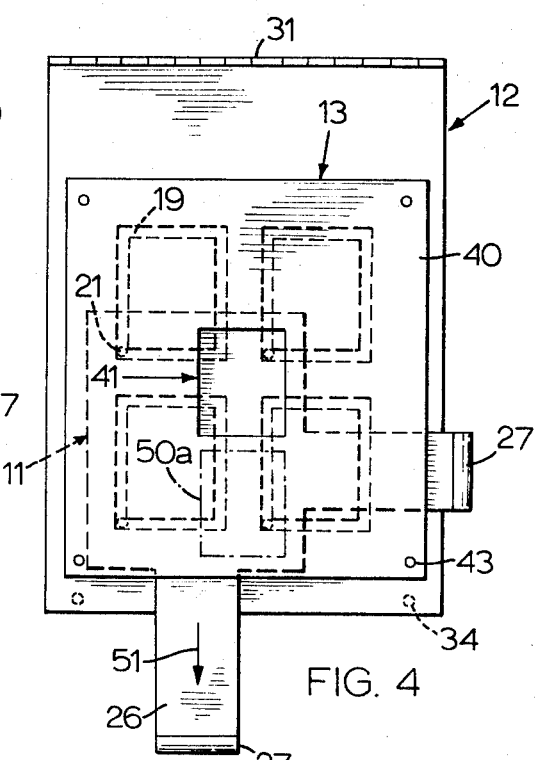
Figure 5:
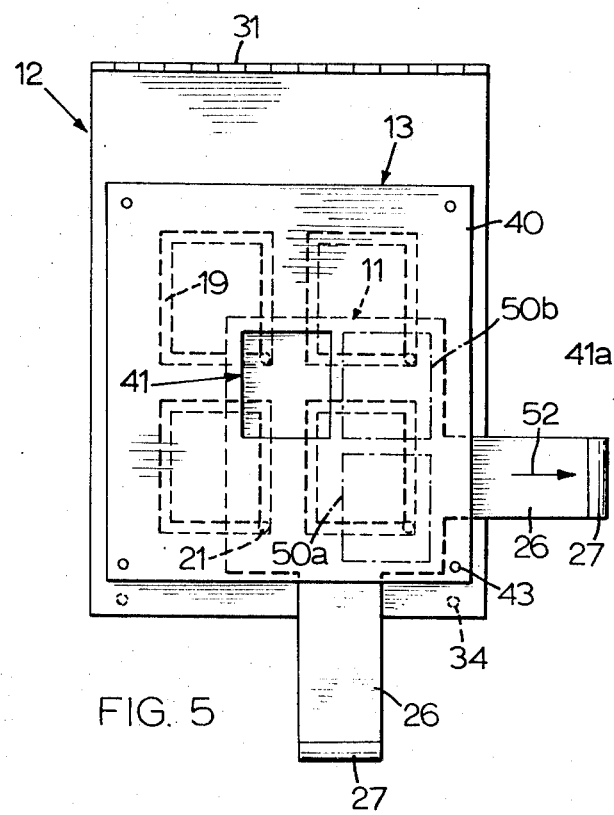

To obtain a four-print exposure on photographic sheet 50, a mask 13, using a centered aperture 41 of the size of each print, is snapped onto cover 12. When cover 12 has been closed, carrier 11 is moved by handles 26 to locate pins 21 in the upper left-hand corner of grooves 19, as viewed in FIG. 3 of the drawings. In this position of carrier 11, the lower right-hand quadrant of photographic sheet 50 lies directly under aperture 41 for exposure. When that quadrant has been exposed, carrier 11 is moved downwardly in the direction of arrow 51, as seen in FIG. 4, until pins 21 are located in the lower left-hand corners of the four grooves 19 the first exposure being indicated by numeral 50a. This locates the upper right-hand quadrant of photographic sheet 50 directly beneath aperture 41 of mask 13 for the second exposure on the sheet. The third exposure is obtained by sliding carrier 11 across platform 10 in the direction of arrow 52, as seen in FIG. 5, to locate pins 21 in the bottom right-hand corners of grooves 19, locating the upper left quadrant of photographic sheet 50 directly beneath aperture 41 for exposure, the second exposure being indicated by numeral 50b. The remaining lower left-hand quadrant of sheet 50 is exposed by moving carrier 11 upwardly to register pins 21 in the upper right-hand corners of grooves 19.

Photographic sheet 50, having the four quadrants (or a lesser number) exposed is easily removed by raising cover 12 and frame 23 to give access to the sheet lying in carrier 11.

Figure 6:
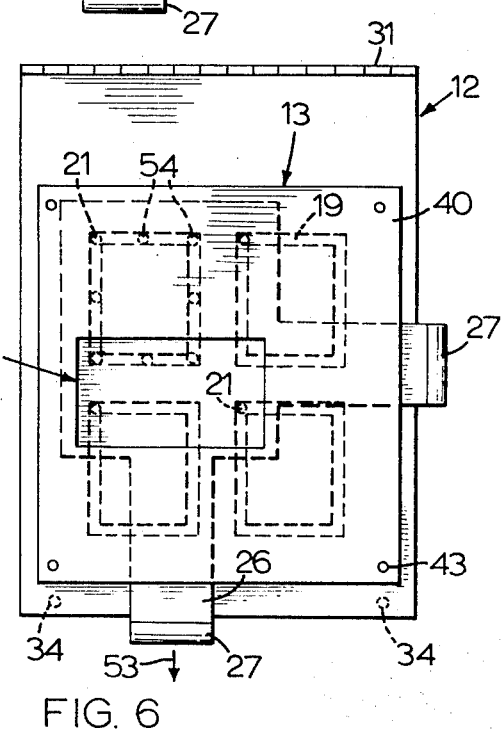
FIG. 6 is a view similar to FIG. 3 but with the mask having a different aperture.

To obtain two, larger, prints on the same size of photographic paper 50, a mask 13 as shown in FIG. 6 may be used, with an aperture 41a located to expose the lower half of a photographic sheet 50 in position on carrier 11, and with pins 21 of carrier 11 located in the top left-hand corners of grooves 19. After exposing the lower half of photographic sheet 50, carrier 11 is moved by handle 26 downwardly in the direction of arrow 53 to locate pins 21 in the lower left-hand corners of grooves 19, which positions the upper half of sheet 50 immediately below aperture 41a for exposure.

To obtain a single full size exposure on photographic sheet 50, an aperture 41 double the size of aperture 41a is located in mask 13 to be positioned, when mask 13 is mounted on cover 12, immediately above the position of carrier 11 as shown in FIG. 6 of the drawings.

For other sizes of prints obtainable on photographic sheet 50, suitable depressions 54 (seen in FIGS. 6 and 6a) may be used to register pins 21 at specific locations along the path of grooves 19 with the pins preferably being each movable in a cavity 55 in carrier member 20 and urged downwardly by a compression spring 56 as seen in FIG. 6a. Alternately, suitable detents (not shown) may be carried by handles 26 to register with depressions located on upper surface 16 of platform 10 or the detents may be carried by platform 10 and the depressions located in handles 26.

It will be appreciated that the construction of grooves 19 may be varied to effect the operation of the apparatus in the desired manner; for instance the grooves may be raised channels. Alternately, each quadrant encompassed by the rectangular path of each groove may be depressed, although this would provide a less convenient operation of the device. Such totally depressed quadrants could accommodate a rectangular plate or the like in place of the four individual pins 21 located beneath carrier 11. Also, two grooves 19, providing rectangular paths diagonally located with respect to the carrier would serve the purpose, with two pins 21 diagonally located on member 20.

It will also be appreciated that one mask 13 may be used with an aperture adjustable to the area sizes and locations described above with respect to the interchangeable masks.

I claim:

1. A photographic easel for printing pictures, comprising:
   a platform having a flat upper surface;
   guide means comprising a plurality of separate grooves located in the upper surface of the platform each forming a closed, rectangular path therein and together arranged in grid formation, the carrier having a plurality of pins depending therefrom and one pin being engageable with each groove;
   a carrier adapted to receive and hold photographic paper therein, the carrier having means engageable with the guide means and slidable therein in two mutually perpendicular directions across the upper surface of the platform;
   a masking frame registrable over the platform and the carrier and having an aperture therein, the aperture being located with respect to the platform whereby the carrier when moved in the guide means registers different portions of the photographic paper beneath the aperture; and
   means on the carrier for manually sliding the carrier in the guide means.

2. An easel as claimed in claim 1 in which the means for manually sliding the carrier comprises at least one handle projecting laterally from the carrier beyond the periphery of the platform when the masking frame is registered thereon.

3. An easel as claimed in claim 1 in which the masking frame is hinged along one edge to the platform.

4. An easel as claimed in claim 1 in which the masking frame comprises a holder frame adapted to carry an apertured mask releasably mounted thereon.

5. An easel as claimed in claim 1 in which the platform carries four grooves forming four closed paths in two parallel rows with two paths in each row.

6. An easel as claimed in claim 1 including a flange circumscribing the aperture and depending from the masking frame.

7. An easel as claimed in claim 1 including limiting means in each groove intermediate the corners formed by the rectangular paths thereof, and means on the carrier to register with the intermediate limiting means.

8. An easel as claimed in claim 6 in which the intermediate limiting means comprise depressions in the grooves and the registering means comprise spring loaded pins releasably engageable with said depressions.

* * * * *